(12) United States Patent
Wakamiya

(10) Patent No.: US 10,475,159 B2
(45) Date of Patent: Nov. 12, 2019

(54) IMAGE PROCESSING APPARATUS, IMAGE PROCESSING METHOD, AND STORAGE MEDIUM STORING PROGRAM TO SCALE IMAGE HAVING HIERARCHICAL LAYER

(71) Applicant: CANON KABUSHIKI KAISHA, Tokyo (JP)

(72) Inventor: Daisuke Wakamiya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 15/787,138

(22) Filed: Oct. 18, 2017

(65) Prior Publication Data
US 2018/0114292 A1    Apr. 26, 2018

(30) Foreign Application Priority Data
Oct. 20, 2016 (JP) .................................. 2016-206333

(51) Int. Cl.
*G06T 3/40* (2006.01)
(52) U.S. Cl.
CPC ............ *G06T 3/4007* (2013.01); *G06T 3/403* (2013.01); *G06T 3/4015* (2013.01); *G06T 3/4076* (2013.01)
(58) Field of Classification Search
CPC combination set(s) only.
See application file for complete search history.

(56) References Cited

U.S. PATENT DOCUMENTS

| 6,272,261 B1* | 8/2001 | Matsuoka | G06T 3/4007 382/190 |
| 8,675,999 B1* | 3/2014 | Liang | G06T 3/4053 382/299 |
| 9,984,440 B2* | 5/2018 | Lin | G06T 3/40 |
| 2012/0268465 A1* | 10/2012 | Inada | G06T 11/00 345/428 |
| 2013/0135347 A1* | 5/2013 | Inada | G09G 5/395 345/629 |
| 2013/0176211 A1* | 7/2013 | Inada | H04N 19/593 345/156 |
| 2015/0123993 A1* | 5/2015 | Ohba | G09G 5/00 345/629 |

FOREIGN PATENT DOCUMENTS

JP    2012-151638 A    8/2012

* cited by examiner

*Primary Examiner* — Tsung Yin Tsai
(74) *Attorney, Agent, or Firm* — Canon U.S.A., Inc. IP Division

(57) ABSTRACT

A first enlargement circuit enlarges an image of a hierarchical layer on a lower side among images of hierarchical layers in which an image of a lower hierarchical layer is a reduced image generated by reducing an image of an upper hierarchical layer. A region extraction circuit extracts a region according to a size of the block of the hierarchical layer on the upper side from a region in the image enlarged by the first enlargement circuit that is at least wider than the block of the hierarchical layer on the upper side. A first hierarchical addition circuit combines an image of the region extracted by the region extraction circuit to the block of the hierarchical layer on the upper side block by block for the blocks.

5 Claims, 9 Drawing Sheets

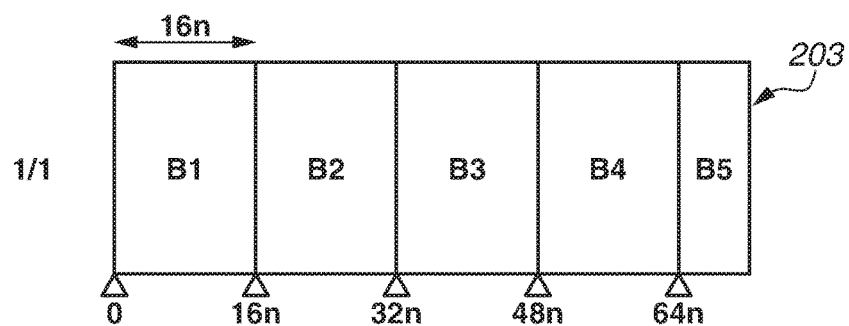
FIG.5A
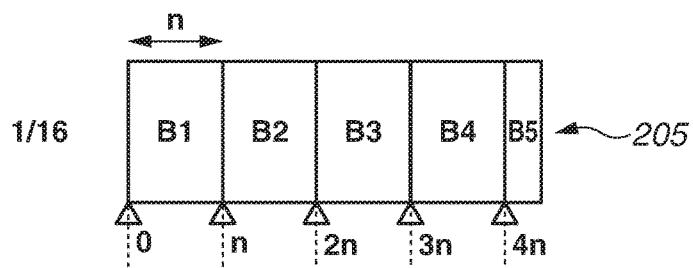
FIG.5B
FIG.5C
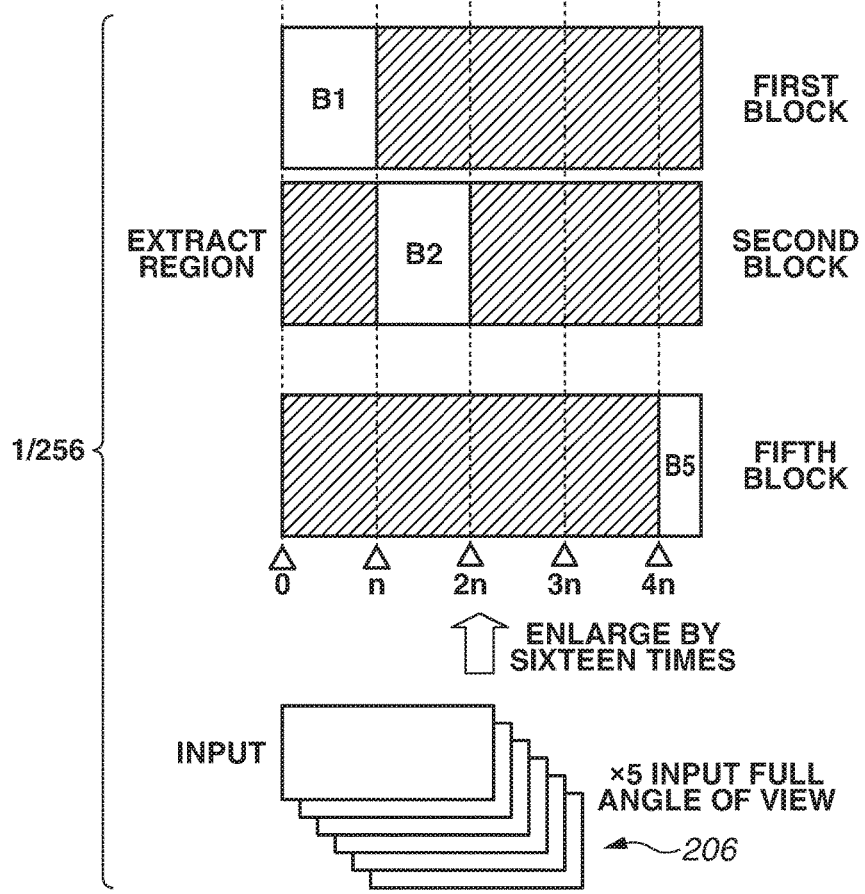

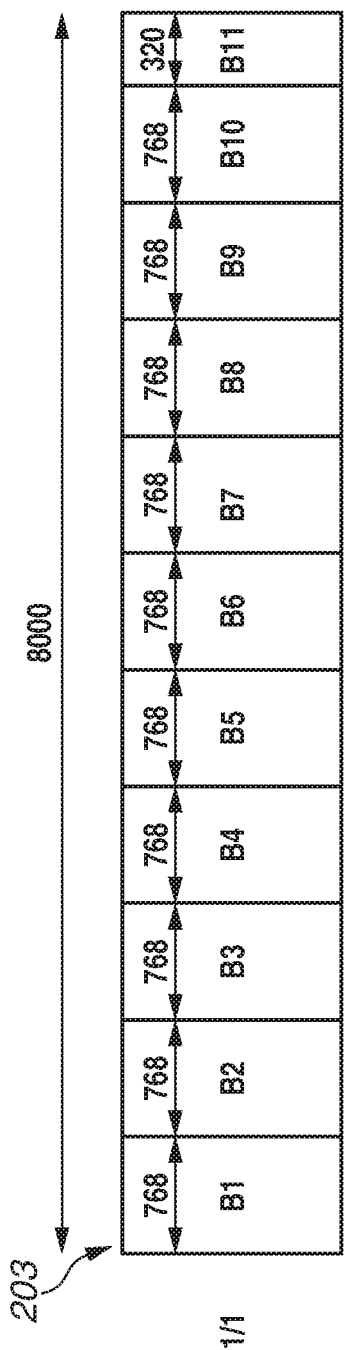
FIG. 7A 1/1
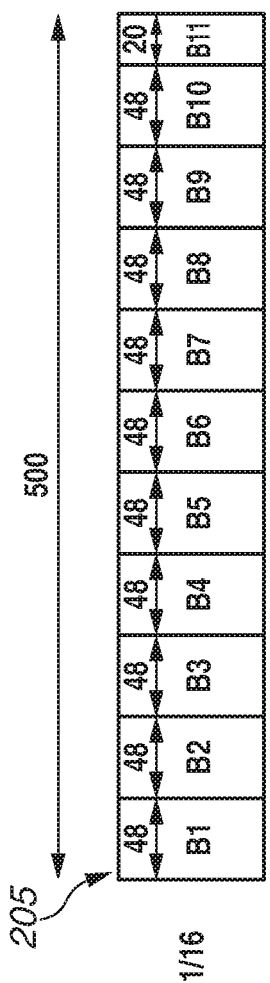
FIG. 7B 1/16
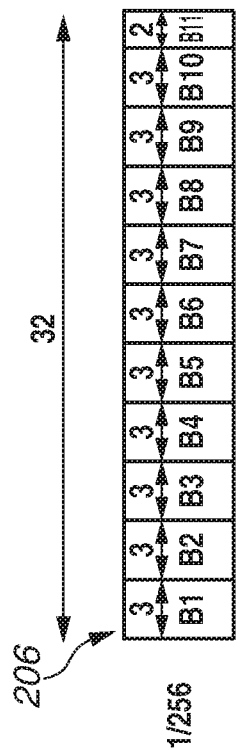
FIG. 7C 1/256

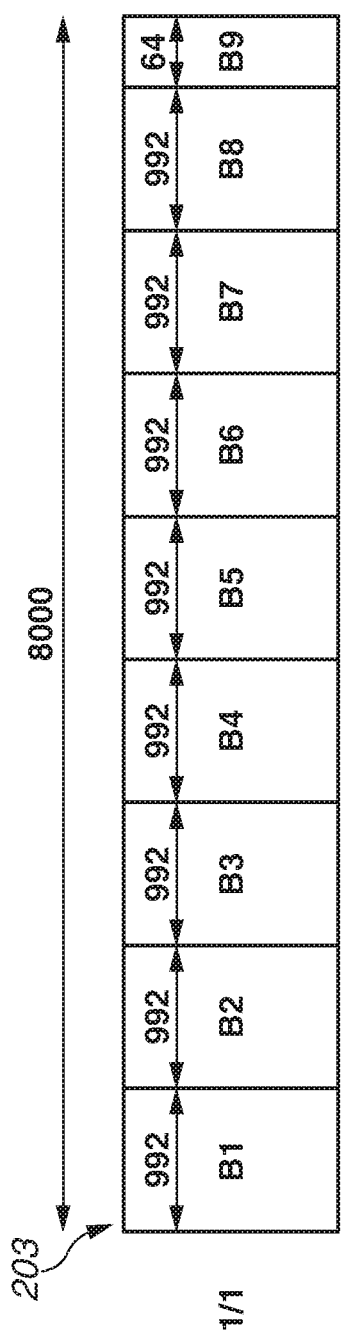
FIG. 8A 1/1
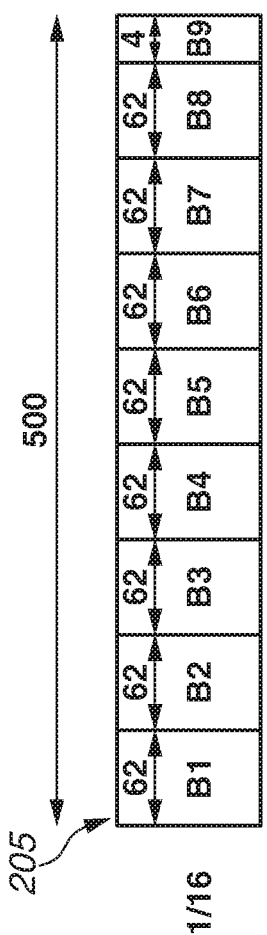
FIG. 8B 1/16
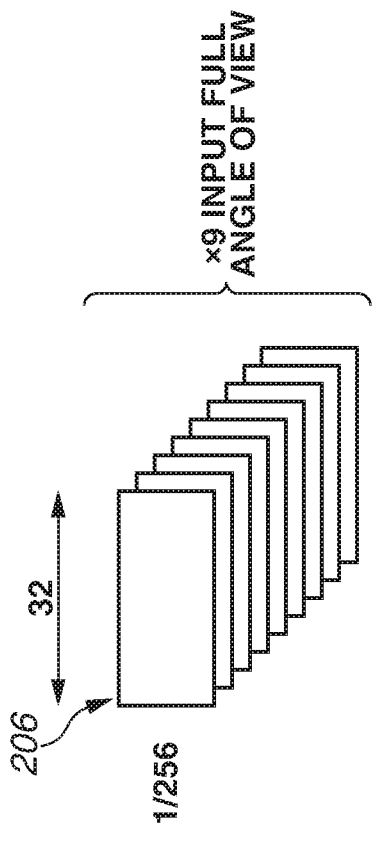
FIG. 8C 1/256

IMAGE PROCESSING APPARATUS, IMAGE PROCESSING METHOD, AND STORAGE MEDIUM STORING PROGRAM TO SCALE IMAGE HAVING HIERARCHICAL LAYER

BACKGROUND OF THE INVENTION

Field of the Invention

One aspect of the embodiments relates to a technique to enlarge or reduce an image by an image processing apparatus, an image processing method, and a storage medium storing a program.

Description of the Related Art

Processing for enlarging and reducing an image is used in an image processing apparatus such as an imaging apparatus. Generally, the imaging apparatus processes the image in a raster direction. Therefore, when tap processing, which refers to a plurality of lines, is performed in the enlargement or reduction processing in a vertical direction, a line memory is used. Further, processing entire one image (an image corresponding to one frame) at once requires a memory having a capacity as large as at least a horizontal size of the image as the line memory. On the other hand, in recent years, the number of pixels handled by the image processing apparatus has been increasing to cope with an increase in the number of pixels in the imaging apparatus and support next-generation high-definition standards so-called 4 Kilo (K), 8K, and the like. The increase in the number of pixels handled by the image processing apparatus also raises a necessity of an increase in the capacity of the line memory. However, the increase in the capacity of the line memory leads to a cost increase.

Therefore, there has been proposed a technique for configuring the image processing apparatus to divide the image into blocks in a horizontal direction to process the image divided-block by divided-block, thereby reducing the capacity of the line memory required for the processing and thus achieving a cost reduction. For example, Japanese Patent Application Laid-Open No. 2012-151638 discusses a technique for performing the processing for enlarging and reducing the image divided-block by divided-block. According to the technique discussed in Japanese Patent Application Laid-Open No. 2012-151638, divided blocks adjacent to each other are input while being caused to overlap each other by pixels corresponding to the number of pixels for the tap processing due to the enlargement/reduction processing. This processing allows the image processing apparatus to acquire a similar result to a result when processing entire one image at once, even when processing the image divided-block by divided-block.

Then, for example, a further reduction in the capacity of the line memory to further reduce the cost leads to an increase in the number of divided blocks, and, in this case, the number of pixels to be processed in total undesirably increases by an amount corresponding to surrounding overlapping pixels to be used in filter processing or the like. Further, the increase in the number of divided blocks leads to an addition or the like of a control period required for each of the divided blocks, thereby resulting in undesirable deterioration of a processing performance.

SUMMARY OF THE INVENTION

According to one aspect of the embodiments, an image processing apparatus includes an enlargement circuit, a combination circuit, and an extraction circuit. The enlargement circuit is configured to enlarge an image of a hierarchical layer on a lower side among images of two or more hierarchical layers in which an image of a lower hierarchical layer is a reduced image generated by reducing an image of an upper hierarchical layer. The combination circuit is configured to combine the enlarged image of the hierarchical layer on the lower side and an image of a hierarchical layer on an upper side block by block for a plurality of blocks into which the image of the hierarchical layer on the upper side is divided. The extraction circuit is configured to extract a partial region corresponding to the block of the hierarchical layer on the upper side from the image enlarged by the enlargement circuit. The extraction circuit extracts the partial region according to a size of the block of the hierarchical layer on the upper side from a region in the image enlarged by the enlargement circuit that is at least wider than the block of the hierarchical layer on the upper side. An image of the partial region extracted by the extraction circuit is combined to the block of the hierarchical layer on the upper side by the combination circuit block by block for the blocks.

According to another aspect of the embodiments, an image processing apparatus is configured to process an image block by block for a plurality of blocks into which the image is divided. The image processing apparatus includes an enlargement circuit configured to enlarge an input image, and an extraction circuit configured to extract a partial region from the image enlarged by the enlargement circuit. The extraction circuit extracts the partial region according to a size of the block from a region in the image enlarged by the enlargement circuit that is at least wider than the block. An image of the partial region extracted by the extraction circuit is an image processed block by block for the blocks.

Further features of the disclosure will become apparent from the following description of exemplary embodiments with reference to the attached drawings.

BRIEF DESCRIPTION OF THE DRAWINGS

FIG. 5A illustrates an overview of block division of a 1/1 gain image, FIG. 5B illustrates an overview of block division of a 1/16 gain image, and FIG. 5C illustrates overviews of enlargement processing and processing for extracting a specific region on a 1/256 gain image.

FIG. 7A illustrates the number of divided blocks in a case where the 1/1 gain image is processed after being divided into eleven blocks, FIG. 7B illustrates the number of divided blocks in a case where the 1/16 gain image is processed after being divided into eleven blocks, and FIG. 7C illustrates the number of divided blocks in a case where the 1/256 gain image is processed after being divided into eleven blocks.

FIG. 8A illustrates the number of divided blocks in a case where the 1/1 gain image is processed after being divided into nine blocks, FIG. 8B illustrates the number of divided blocks in a case where the 1/16 gain image is processed after being divided into nine blocks, and FIG. 8C illustrates that the 1/256 gain image is read out from a random access memory (RAM) nine times without being divided into the blocks.

DESCRIPTION OF THE EMBODIMENTS

Figure 1:
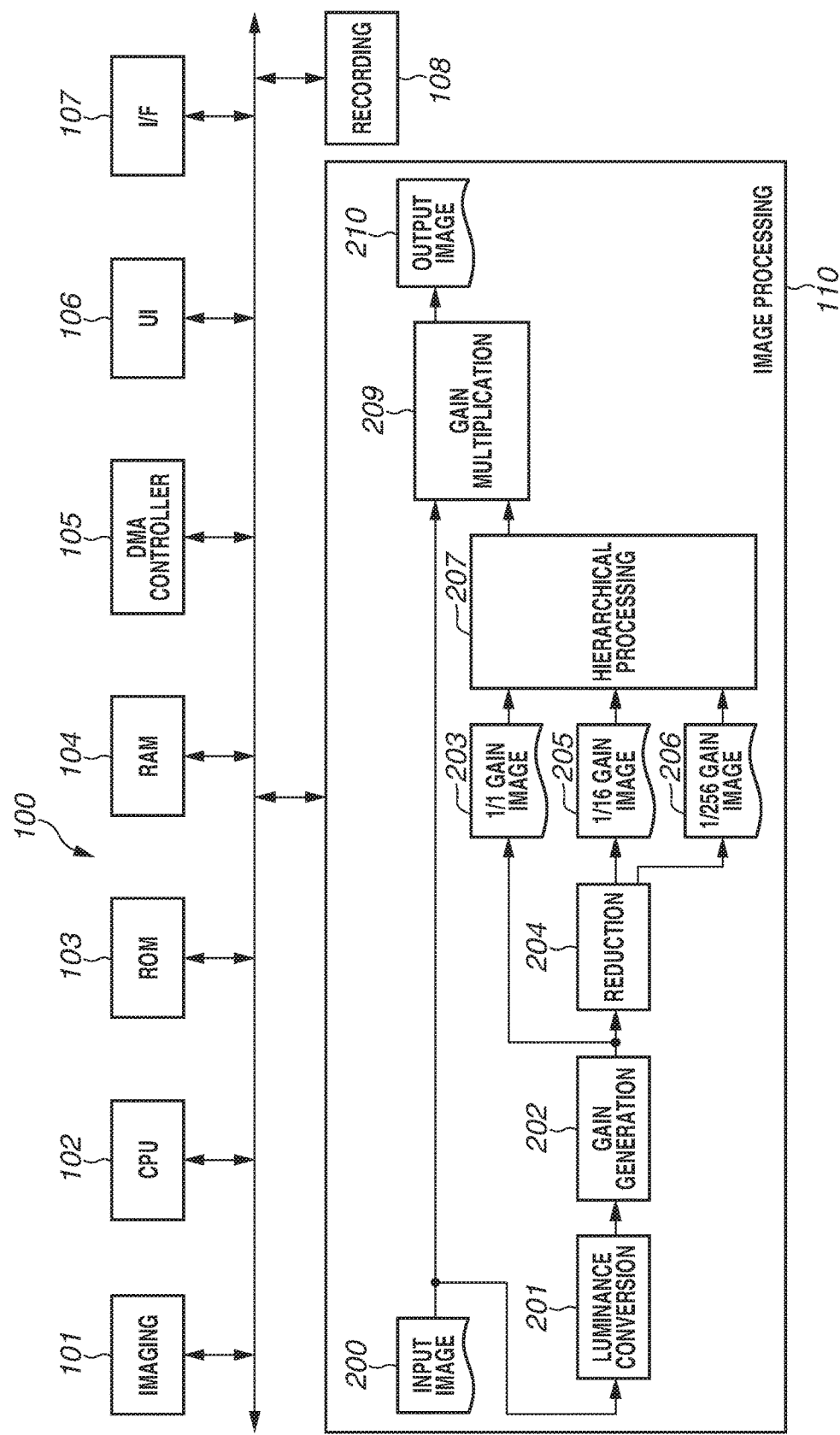
FIG. 1 illustrates an overview of a configuration of an imaging apparatus according to one exemplary embodiment of an image processing apparatus.

In the following description, exemplary embodiments of the disclosure will be described in detail with reference to the drawings. An image processing apparatus according to each of the present exemplary embodiments is applicable to various kinds of imaging apparatuses, such as a digital camera, a digital video camera, various kinds of mobile terminals such as a smartphone and a tablet terminal equipped with a camera function, a camera for industrial use, an in-vehicle camera, and a camera for medical use.

The image processing apparatus according to each of the present exemplary embodiments divides an input image into blocks and performs various kinds of image processing such as enlargement and reduction divided-block by divided-block, thereby succeeding in reducing a capacity of a line memory required for the processing and achieving a cost reduction. An operation to enlarge and/or to reduce an image may be referred to a scaling operation. Further, the image processing apparatus according to each of the present exemplary embodiments distributes the input image to a plurality of two or more hierarchical layers and performs processing for each of the hierarchical layers, thereby succeeding in realizing multi-tap processing with lower cost. In the hierarchical processing, first, the input image is reduced at a plurality of reduction ratios different from each other or one another, and reduced images of the plurality of hierarchical layers, which are distinguished from each other or one another in terms of an image resolution, are generated. Next, a reduced image of a lower hierarchical layer is enlarged to the same image size as an image of a hierarchical layer one layer higher than that, and hierarchical addition processing for adding the enlarged image from this lower hierarchical layer and the image of the upper hierarchical layer is performed. In the hierarchical processing, such processing that the reduced image of the lower hierarchical layer is enlarged to the same image size as the image of the upper hierarchical layer and is hierarchically added to the image of the upper hierarchical layer is repeated toward a further upper hierarchical layer sequentially, and an image having the same image size as the original input image is generated. This generated image has the same image size as the original input image but is formed as an image in which a high-frequency component is removed from the input image. Then, adding and combining this image with the high-frequency component removed therefrom and the original image allows advanced image processing dependent on a frequency to be performed. Specific examples of the processing to which the hierarchical processing is applied include tone mapping processing. In the tone mapping processing, a high-frequency component and a low-frequency component are compared to each other and an edge portion and a solid portion other than that in an image are separated from each other, by which tone correction processing such as a correction of a dark portion is performed while an image quality is maintained. Performing this processing through multiple hierarchical layers allows a plurality of frequency components to be accurately detected, thereby allowing a correction effect to be improved. Therefore, it becomes possible to realize image processing such as an accurate correction while reducing the cost, by performing processing as a combination of the above-described hierarchical processing and the above-described block division processing, i.e., operating like processing the image of each of the hierarchical layers after dividing it into the blocks.

Then, when the reduced image is processed after being divided into the blocks for each of the hierarchical layers as described above, a horizontal size (the number of pixels in a horizontal direction) of each of the divided blocks is often set to a constant multiple or a linear function of the reduction ratio of the lower hierarchical layer. This is because setting the size in the above-described manner allows an image size and a start pixel position of the lower hierarchical layer in each of the divided blocks to be calculated as an integer, and further allows a constant position and size to be used as a position and a size from which and by which the image is read out from a memory for each of the divided blocks. This effect allows the image to be easily read out and the hierarchical processing to be simply controlled, thereby succeeding in realizing the accurate processing and the like while reducing the cost.

However, for example, when the reduction ratio of the lower hierarchical layer is low, a constraint on the size of the divided block increases, and therefore a processing performance may be undesirably deteriorated. For example, if the resolution of the image of the lower hierarchical layer is a resolution equivalent to 1/256 of the original input image, an attempt to set the image size and the start pixel position of the lower hierarchical layer to an integer raises a necessity of processing the image having the resolution of the original input image according to a horizontal size that is a multiple of 256. Therefore, the horizontal size for each of the divided blocks cannot be controlled with fineness such as an adjustment by a dozen pixels. This constraint may cause an increase in the number of blocks into which the image is divided depending on the image size of the input image. The increase in the number of divided blocks results in an increase in the number of pixels to be processed in total by an amount corresponding to surrounding overlapping pixels to be used in filter processing or the like and an addition of a control period required for each of the divided blocks, thereby leading to undesirable deterioration of the processing performance.

The image processing apparatus according to each of the present exemplary embodiments includes the following configuration to ease the constraint on the size of the divided block and allow the image processing such as the accurate correction to be realized while reducing the cost, when processing the input image after distributing it to the hierarchical layers and dividing it into the blocks for each of the hierarchical layers.

FIG. 1 illustrates an overview of a configuration of an imaging apparatus 100 according to a first exemplary embodiment, which is one example of application of the image processing apparatus.

The imaging apparatus 100 illustrated in FIG. 1 includes an imaging unit 101, a central processing unit (CPU) 102, a read only memory (ROM) 103, a random access memory (RAM) 104, a direct memory access (DMA) controller 105, a user interface device 106, an external interface (I/F) 107, a recording medium 108, an image processing circuit 110, and the like. The imaging unit 101 includes an optical system, an image sensor, and the like, and captures an image to acquire this captured image as an input image. The CPU 102 controls each of the units and carries out various kinds of calculations. The ROM 103 stores therein programs or instructions used for the CPU 102 to, for example, control each of the units and perform various kinds of processing, various kinds of parameters, and the like, including performing operations as described in the following. The RAM 104 is, for example, used as a work area of the CPU 102 and used to temporarily store input or output image data, image data in the middle of being processed, and the like. The RAM 104 may also store instructions that, when executed by the CPU 102, cause the CPU 102 to perform operations as described in the following. The instructions may be transferred from a non-volatile memory such as the ROM 103 or the recording medium 108 through an appropriate device controller (e.g., mass storage controller). The RAM 104 may also include a dynamic RAM (DRAM). The DMA controller 105 is a controller for realizing DMA. The user interface device 106 includes various kinds of operation devices operated by a user, and a display device such as a display. The external I/F 107 is an interface for communicating various kinds of data such as image data, a program, and the like. The recording medium 108 is configured to include various kinds of recording media such as a semiconductor memory card or a hard disk or configured detachably attachably, and records therein various kinds of data such as image data, a program, and the like. The image processing circuit 110 performs various kinds of image processing on, for example, the captured image acquired by the imaging unit 101, the input image from the external I/F 107, the recording medium 108, or the like.

In the present exemplary embodiment, the imaging apparatus 100 will be described, citing an example configured to achieve a function of multiplying the input image by a different gain for each pixel by tone mapping processing as one example of image processing performed by the image processing circuit 110.

In the image processing circuit 110 illustrated in FIG. 1, assume that an input image 200 is, for example, image data after noise and the like due to the image sensor are removed from the captured image acquired by the imaging unit 101. In the image sensor of the imaging unit 101, each pixel is orderly arrayed in correspondence with each of red (R), green (G), and blue (B) colors, which is generally called a Bayer array. Therefore, the input image 200 is acquired as image data based on the captured image formed by the image sensor having the Bayer array. Further, in the case of the present exemplary embodiment, data of the input image 200 is read out after being temporarily stored in a memory (the RAM 104) so as to be timed according to a delay amount due to processing at a subsequent stage. The input image 200 may be such image data that the captured image data output from the image sensor is directly input without the intervention of the RAM 104. The data of the input image 200 is transmitted to a luminance conversion circuit 201 and a gain multiplication circuit 209, which will be described below, via the temporary storage in the RAM 104.

The luminance conversion circuit 201 multiplies the data of the input image 200 by a luminance conversion coefficient. By this multiplication, the input image 200 is converted into a luminance image. Assume that the luminance conversion coefficient is provided for each of the colors according to the Bayer array in the image sensor. Data of the luminance image output from the luminance conversion circuit 201 is transmitted to a gain generation circuit 202.

The gain generation circuit 202 multiplies the data of the luminance image generated by the luminance conversion circuit 201 by a gain coefficient. By this multiplication, the luminance image is converted into a gain image. In the present exemplary embodiment, the gain image for performing the tone mapping processing is generated, so that the gain generation circuit 202 multiplies the luminance image by such a gain coefficient that a gain increases as a luminance value reduces. The gain image generated by the gain generation circuit 202 is read out after being temporarily stored in the RAM 104 so as to be timed according to a delay amount due to processing at a subsequent stage, although this is also omitted from the illustration here. The gain image generated by the gain generation circuit 202 is an image at the same magnification as the luminance image (hereinafter referred to as a 1/1 gain image 203). In the case of the present exemplary embodiment, the 1/1 gain image 203 corresponds to an image of an uppermost hierarchical layer in the hierarchical processing. Data of this 1/1 gain image 203 is transmitted to a hierarchical processing circuit 207 and a reduction circuit 204.

The reduction circuit 204 performs reduction processing on the 1/1 gain image 203 fed from the gain generation circuit 202. A known method can be used as a method for the reduction processing and a detailed description thereof will be omitted here, but one example of the usable method is a method based on an addition in the image region by region for a predetermined unit region and normalization according to the number of added pixels. In the case of the present exemplary embodiment, the reduction circuit 204 reduces the 1/1 gain image 203 to, for example, 1/16 to thereby generate a 1/16 gain image 205, and reduces the 1/1 gain image 203 to, for example, 1/256 to thereby generate a 1/256 gain image 206. In the case of the present exemplary embodiment, the 1/16 gain image 205 corresponds to an image of an intermediate hierarchical layer, and the 1/256 image 206 corresponds to an image of a lowermost hierarchical layer. Data of the 1/16 gain image 205 and data of the 1/256 gain image 206 generated by the reduction circuit 204 are transmitted to the hierarchical processing circuit 207. All of the 1/1 gain image 203, the 1/16 gain image 205, and the 1/256 gain image 206 are gain images, and a high-frequency component is more removed and a low-frequency component more remains in the image as the image has a higher reduction ratio, i.e., the image belongs to a further lower hierarchical layer.

The hierarchical processing circuit 207 generates a gain map image by hierarchically adding the images of the respective hierarchical layers of the 1/1 gain image 203, the 1/16 gain image 205, and the 1/256 gain image 206. Details of a configuration and processing of the hierarchical processing circuit 207 will be described below. Data of the gain map image generated by the hierarchical processing circuit 207 is transmitted to the gain multiplication circuit 209.

The gain multiplication circuit 209 generates an output image 210 by multiplying the data of the input image 200 by the data of the gain map image generated by the hierarchical processing circuit 207. Then, the gain map image is formed from the gain image in which the above-described luminance image is multiplied by such a gain coefficient that the value thereof increases as the luminance value reduces, i.e., such a gain coefficient that a darker region has a larger value. Therefore, multiplying the input image 200 by this gain map image allows a dark portion in the input image 200 to be multiplied by a relatively large gain, allowing the output image 210 to be formed as an image subjected to the tone mapping processing based on a correction of the dark portion.

Figure 2:
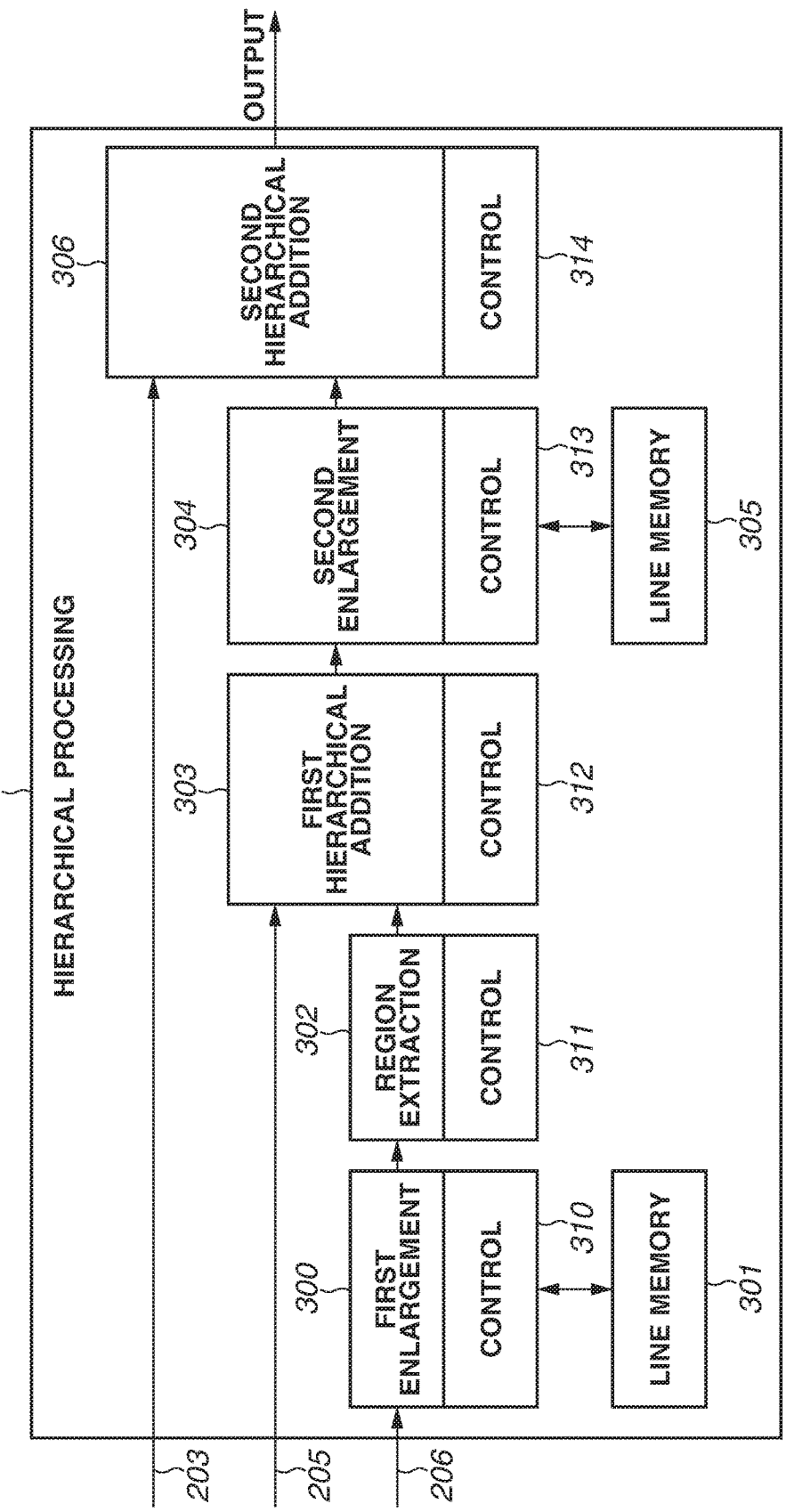
FIG. 2 illustrates an overview of a configuration of a hierarchical processing circuit.

FIG. 2 illustrates a detailed configuration of the hierarchical processing circuit 207.

The hierarchical processing circuit 207 illustrated in FIG. 2 includes a first enlargement circuit 300, a line memory 301, a region extraction circuit 302, a first hierarchical addition circuit 303, a second enlargement circuit 304, a second hierarchical addition circuit 306, and a line memory 305. Data is input to and output from each of the individual sub modules, i.e., the first enlargement circuit 300, the region extraction circuit 302, the first hierarchical addition circuit 303, the second enlargement circuit 304, and the second hierarchical addition circuit 306 via the RAM 104 illustrated in FIG. 1, although this is not illustrated in FIG. 2. In other words, each of the output data pieces from the individual sub modules is read out after being temporarily stored in the RAM 104, and is input to a next sub module (at a subsequent stage). The data is written into and read out from the RAM 104 under control by the DMA controller 105.

Further, control circuits 310 to 314 are provided to the individual sub modules, i.e., the first enlargement circuit 300, the region extraction circuit 302, the first hierarchical addition circuit 303, the second enlargement circuit 304, and the second hierarchical addition circuit 306, respectively, as illustrated in FIG. 2. Each of the control circuits 310 to 314, for example, controls whether to divide the image into blocks, and a block size (the number of pixels) and a position if the image is divided into the blocks, based on parameters preset for each of them. The parameters are information including whether to divide the image into the blocks, the block size and the position, a relative offset, and the like, and these pieces of information are set for each of the hierarchical layers individually. The parameter of whether to divide the image into the blocks is set as information indicating whether to divide the image into the blocks in the sub module. The parameter of the block size and the position is set as information indicating the block size and the position of each of the divided blocks with respect to the image if the image is divided into the blocks in the sub module. The parameter of the relative offset is set as a value indicating a relative position of each of the divided blocks if the image is divided into the blocks in the sub module. Each of the circuits 310 to 314 includes, for example, a pixel counter, and controls the number of divided blocks, the block size, the position, and the like based on the number of pixels acquired by counting pixels in the image if the image is divided into the blocks. For example, if the image is divided into the blocks, the pixel counter counts the number of pixels in the image, and each of the circuits 310 to 14 performs control such as dividing the image into the blocks at a separation point determined according to the number of pixels corresponding to the position and the block size of the divided block set by the above-described parameters. Further, in the present exemplary embodiment, whether to divide the image into the blocks is controlled when the data is read out from the RAM 104 by the DMA controller 105.

As described above, each of the sub modules, i.e., the first enlargement circuit 300, the region extraction circuit 302, the first hierarchical addition circuit 303, the second enlargement circuit 304, and the second hierarchical addition circuit 306 is configured to input and output the data via the RAM 104 in the hierarchical processing circuit 207 illustrated in FIG. 2. Further, each of these sub modules is controlled about whether to divide the image into the blocks at each of the hierarchical layers based on the parameter set for each of the hierarchical layers, and the image is divided into the blocks based on the parameter at the hierarchical layer where the image is divided into the blocks. Then, the hierarchical processing circuit 207 performs processing like an example that will be described below, on the image of each of the hierarchical layers (an image for each of the divided blocks in the case of the hierarchical layer where the image is divided into the blocks). In the following description, each of the units of the hierarchical processing circuit 207 illustrated in FIG. 2 will be described, keeping these features in mind.

In the hierarchical processing circuit 207 illustrated in FIG. 2, the data of the above-described 1/1 gain image 203 of the upper hierarchical layer is input to the second hierarchical addition circuit 306. The data of the 1/16 gain image 205 of the intermediate hierarchical layer is input to the first hierarchical addition circuit 303, and the data of the 1/256 gain image 206 of the lower hierarchical layer is input to the first enlargement circuit 300.

The first enlargement circuit 300 performs enlargement processing on the 1/256 gain image 206. In the present exemplary embodiment, the first enlargement circuit 300 enlarges the 1/256 gain image 206 by sixteen times. As will be described in detail below, in the case of the first exemplary embodiment, the 1/256 gain image 206 is not divided into the blocks and the entire image is subjected to the enlargement processing at once. For example, processing such as a bilinear interpolation using an adjacent pixel can be used as a method for the enlargement processing by the first enlargement circuit 300. Further, at the time of the enlargement processing, the first enlargement circuit 300 also carries out an interpolation in a vertical direction by using data of an adjacent line accumulated in the line memory 301. Data of a gain image generated by enlarging the 1/256 gain image 206 by sixteen times by the first enlargement circuit 300, i.e., data of a 1/16 gain image is transmitted to the region extraction circuit 302.

The region extraction circuit 302 performs region extraction processing that cuts out a partial region from the gain image (the 1/16 gain image) subjected to the enlargement processing by the first enlargement circuit 300, as a specific region. The region extraction circuit 302 performs the region extraction processing pixel by pixel. Details of the region extraction processing by the region extraction circuit 302 will be described below. Data output from the region extraction circuit 302 is transmitted to the first hierarchical addition circuit 303.

The first hierarchical addition circuit 303 combines the data of the above-described 1/16 gain image 205 and the output data from the region extraction circuit 302 by hierarchical addition processing. In the case of the present exemplary embodiment, the first hierarchical addition circuit 303 adds the data of the 1/16 gain image 205 and the output data from the region extraction circuit 302 after multiplying each of them by a predetermined coefficient ratio uniformly. As will be described in detail below, in the case of the first exemplary embodiment, the first hierarchical addition circuit 303 divides the 1/16 gain image 205 into the blocks, and combines data of this divided block and data of the specific region extracted by the region extraction circuit 302 by the hierarchical addition processing. Data after this hierarchical addition processing performed divided-block by divided-block by the first hierarchical addition circuit 303 is transmitted to the second enlargement circuit 304.

The second enlargement circuit 304 enlarges the data after the hierarchical addition processing performed by the first hierarchical addition circuit 303 by sixteen times with use of processing such as the bilinear interpolation that is similar to that of the first enlargement circuit 300. As will be described in detail below, in the case of the first exemplary embodiment, the second enlargement circuit 304 enlarges the data after the hierarchical addition processing performed divided-block by divided-block by the first hierarchical addition circuit 303 by sixteen times. Further, the second enlargement circuit 304 also carries out the interpolation in the vertical direction by using data of an adjacent line accumulated in the line memory 305, similarly to the example of the first enlargement circuit 300. Since the data after the hierarchical addition processing by the first hierarchical addition circuit 303 is the 1/16 gain image, the image enlarged by sixteen times divided-block by divided-block by the second enlargement circuit 304 corresponds to a 1/1 gain image for each of the divided blocks. Data of the 1/1 gain image for each of the divided blocks that is acquired from the enlargement processing by the second enlargement circuit 304 is transmitted to the second hierarchical addition circuit 306.

The second hierarchical addition circuit 306 combines the data of the above-described 1/1 gain image 203 and the data of the 1/1 gain image fed from the second enlargement circuit 304, by the hierarchical addition processing. In the case of the present exemplary embodiment, the second hierarchical addition circuit 306 adds the data of the 1/1 gain image 203 and the data of the 1/1 gain image fed from the second enlargement circuit 304 after multiplying each of them by a predetermined coefficient ratio uniformly, similarly to that of the first hierarchical addition circuit 303. As will be described in detail below, in the case of the first exemplary embodiment, the second hierarchical addition circuit 306 divides the 1/1 gain image 203 into the blocks, and combines data of this divided block and the 1/1 gain image for each of the divided blocks from the second enlargement circuit 304 by the hierarchical addition processing. Then, the second hierarchical addition circuit 306 outputs the data of all of the divided blocks after the hierarchical addition processing to the gain multiplication circuit 209 illustrated in FIG. 1.

In the following description, memory sizes (capacities) required for the line memories (301 and 305) used in the hierarchical processing circuit 207 and a maximum number of pixels in the horizontal direction by which the image can be processed at once, according to the present exemplary embodiment will be described. Now, suppose that the maximum number of pixels in the horizontal direction by which the image can be processed at once by the hierarchical processing circuit 207 is, for example, 1000 pixels. However, the maximum number of pixels in the horizontal direction by which the image can be processed at once by the hierarchical processing circuit 207 depends on the size of the line memory. Further, the size of the line memory may be any size as long as this size coincides with or exceeds a horizontal size of the image before the enlargement processing is performed. For example, in the case of the line memory 305, the line memory 305 stores therein data of a line in the 1/16 gain image before the enlargement processing by the second enlargement circuit 304 among the individual sub modules in the hierarchical processing circuit 207. Therefore, the line memory 305 can be realized by at least a memory having a size equivalent to a value calculated by dividing the maximum number of pixels in the horizontal direction that the hierarchical processing circuit 207 can process at once (1000) by a horizontal size of the 1/16 gain image (16), which is (1000÷16=62.5)≈63 pixels. On the other hand, the image input to the first enlargement circuit 300, i.e., the image undivided into the blocks is fed to the line memory 301. The image undivided into the blocks is an image corresponding to an angle of view of the input image 200, but the image input to the first enlargement circuit 300 is the 1/256 gain image generated by reducing the 1/1 gain image to 1/256 as described above. Therefore, in a case where the maximum size of the input image 200 in the horizontal direction is, for example, 8000 pixels, the line memory 301 can be realized by at least a memory having a size calculated by dividing the maximum size (8000) by 256, i.e., 8000÷256=31.25≈32 pixels.

Next, a flow of the processing performed in the hierarchical processing circuit 207 illustrated in FIG. 2 will be described with reference to flowcharts illustrated in FIGS. 3 and 4. The processing in these flowcharts is performed by the hardware configuration illustrated in FIGS. 1 and 2 in the case of the following description, but may be realized by the execution of the program by the CPU 102 or the like.

In the case of the first exemplary embodiment, the hierarchical processing circuit 207 is configured to divide the 1/1 gain image 203 of the upper hierarchical layer and the 1/16 gain image 205 of the intermediate hierarchical layer into the blocks, but refrain from dividing the 1/256 gain image 206 of the lower hierarchical layer into the blocks. In the following description, first, an example in which the image is processed after being divided into the same number of blocks at all the hierarchical layers including not only the upper hierarchical layer and the intermediate hierarchical layer but also even the lower hierarchical layer will be described with reference to the flowchart illustrated in FIG. 3 to indicate the block division and a content of the processing easily understandably. In other words, the flowchart of FIG. 3 illustrates a flow of the processing in the case where the image is divided into the same number of blocks at all the hierarchical layers and is then subjected to the enlargement processing and the hierarchical addition processing block by block for these divided blocks.

Figure 3:
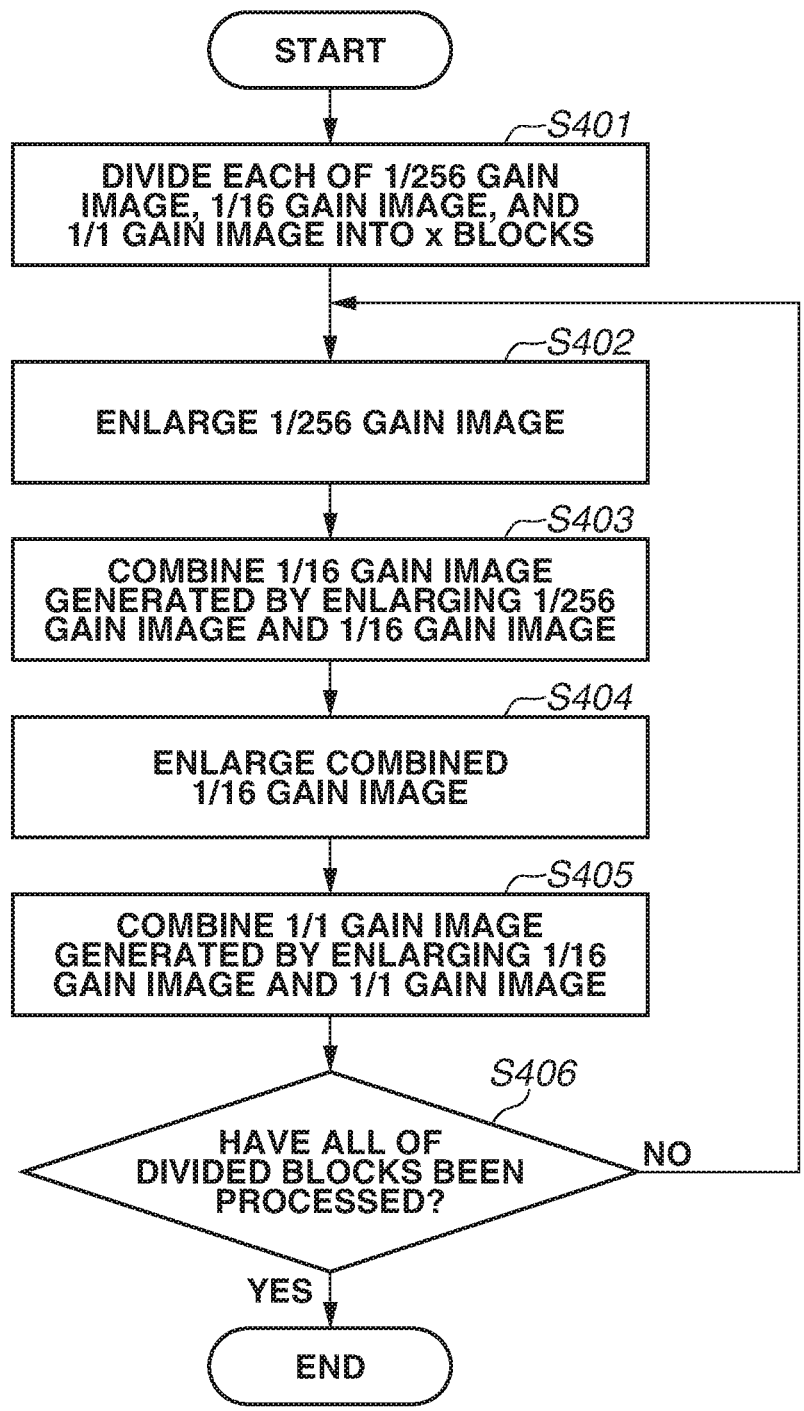
FIG. 3 is a flowchart in a case where an image is processed according to the same number of divided blocks at all hierarchical layers.

In step S401 illustrated in FIG. 3, the first enlargement circuit 300 of the hierarchical processing circuit 207 divides the input 1/256 gain image 206 into x blocks. Similarly, the first hierarchical addition circuit 303 divides the input 1/16 gain image 205 into x blocks, and the second hierarchical addition circuit 306 divides the input 1/1 gain image 203 into x blocks. After step S401, the processing in the hierarchical processing circuit 207 proceeds to step S402. Processing in subsequent steps, steps S402 to S406 is performed divided-block by divided-block sequentially.

In step S402, the first enlargement circuit 300 generates the 1/16 gain image by enlarging the divided block in the 1/256 gain image 206 by sixteen times. After step S402, the processing in the hierarchical processing circuit 207 proceeds to step S403, which is performed by the first hierarchical addition circuit 303. In the case of the flowchart illustrated in FIG. 3, the region extraction circuit 302 transfers the 1/16 gain image of the divided block generated by the enlargement processing performed by the first enlargement circuit 300 therethrough without processing it, and outputs this image to the first hierarchical addition circuit 303.

In step S403, the first hierarchical addition circuit 303 combines the divided block in the 1/16 gain image 205 and the 1/16 gain image of the divided block enlarged by sixteen times by the first enlargement circuit 300, by the hierarchical addition processing divided-block by divided-block. After step S403, the processing in the hierarchical processing circuit 207 proceeds to step S404, which is performed by the second enlargement circuit 304.

In step S404, the second enlargement circuit 304 enlarges the 1/16 gain image of the divided block combined by the hierarchical addition processing performed by the first hierarchical addition circuit 303 by sixteen times. After step S404, the processing in the hierarchical processing circuit 207 proceeds to step S405, which is performed by the second hierarchical addition circuit 306.

In step S405, the second hierarchical addition circuit 306 combines the divided block in the 1/1 gain image 203 and the 1/1 gain image of the divided block enlarged by sixteen times by the second enlargement circuit 304, by the hierarchical addition processing divided-block by divided-block. After step S405, the processing proceeds to step S406, which is also performed by the second hierarchical addition circuit 306.

In step S406, the second hierarchical addition circuit 306 determines whether the processing has been completed on all of the divided blocks. If an unprocessed divided block is still left (NO in step S406), the processing returns to step S402. This return leads to execution of the processing from steps S402 to S405 on the unprocessed divided block in the hierarchical processing circuit 207. On the other hand, if the second hierarchical addition circuit 306 determines that the processing has been completed on all of the divided blocks in step S406 (YES in step S406), the hierarchical processing in the hierarchical processing circuit 207 is determined to be completed and the processing according to the flowchart illustrated in FIG. 3 is ended.

As indicated by this example illustrated in FIG. 3, in the case where the image is divided into the same number of divided blocks at all the hierarchical layers, the hierarchical processing circuit 207 repeats the processing that performs the enlargement processing starting from the lower hierarchical layer, combines this image with the image of the hierarchical layer one layer higher than that, and further performs the enlargement processing on the image of this hierarchical layer and combines this image with the image of the upper hierarchical layer, divided-block by divided-block sequentially. In the present example, this processing has been described referring to the example in which the number of hierarchical layers is three hierarchical layers, but is assumed to be also performed in a similar manner even when the number of hierarchical layers is, for example, two hierarchical layers or four or more hierarchical layers.

The flowchart illustrated in FIG. 3 has been described as the example in which the image is processed after being divided into the same number of divided blocks at all the hierarchical layers, but, in the case of the first exemplary embodiment, the hierarchical processing circuit 207 is configured to divide the image into the blocks at the upper hierarchical layer and the intermediate hierarchical layer while refraining from dividing the image into the blocks at the lower hierarchical layer. The flowchart of FIG. 4 illustrates a flow of the processing according to the first exemplary embodiment. In other words, in the flowchart illustrated in FIG. 4, the 1/16 gain image 205 and the 1/1 gain image 203 are processed after being divided into the blocks but the 1/256 gain image 206 is not divided into the blocks and the entire image is processed at once.

Figure 4:
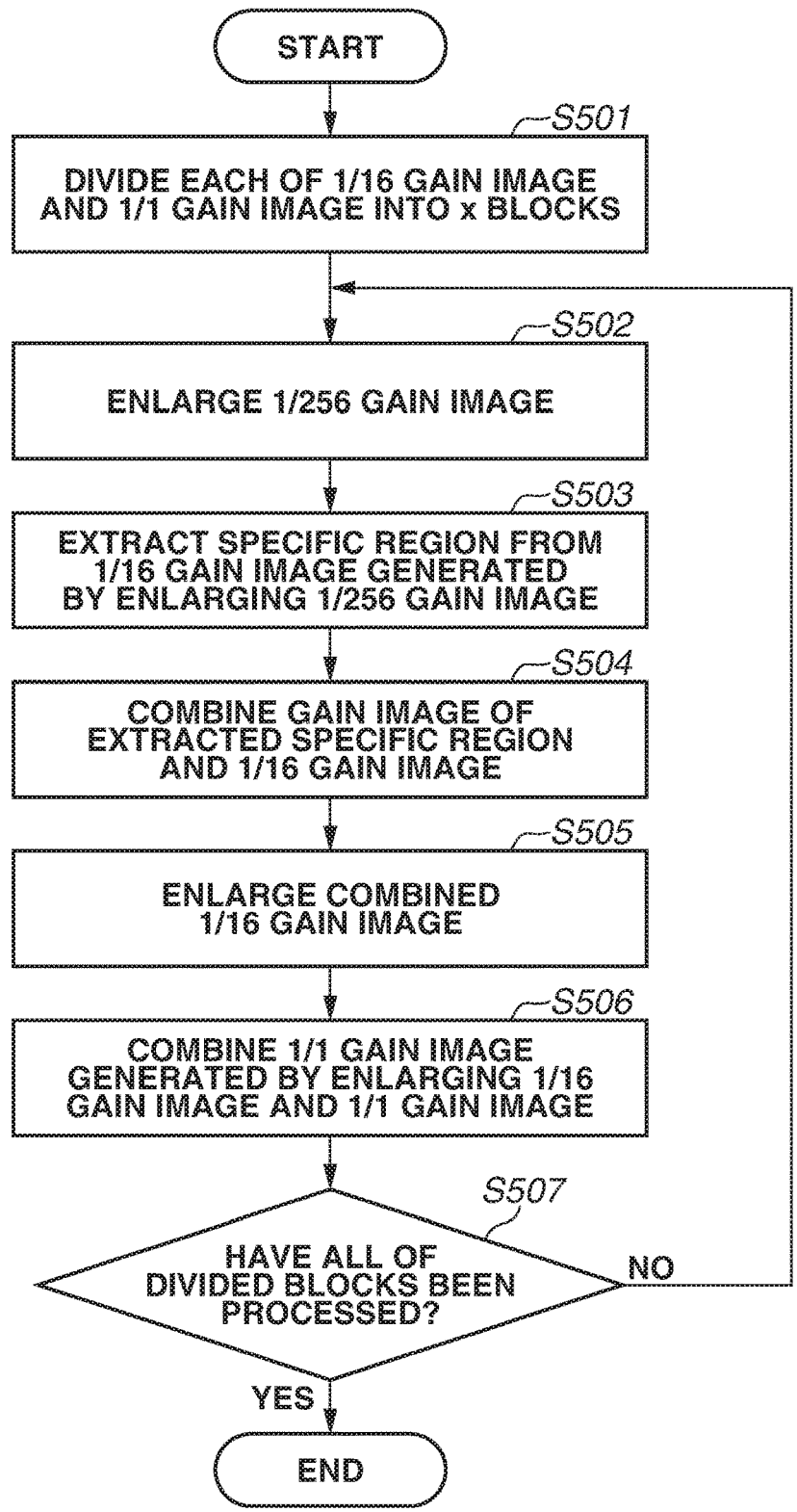
FIG. 4 is a flowchart in a case where the image is not divided into blocks at a lower hierarchical layer.

In step S501 illustrated in FIG. 4, the first hierarchical addition circuit 303 of the hierarchical processing circuit 207 divides the input 1/16 gain image 205 into x blocks, and, further, the second hierarchical addition circuit 306 divides the input 1/1 gain image 203 into x blocks. On the other hand, in step S501 illustrated in FIG. 4, the first enlargement circuit 300 does not divide the 1/256 gain image 206 into the blocks. After step S501, the processing in the hierarchical processing circuit 207 proceeds to step S502. Processing in subsequent steps, steps S502 to S507 is performed divided-block by divided-block sequentially.

In step S502, the first enlargement circuit 300 generates the 1/16 gain image by enlarging the 1/256 gain image 206 undivided into the blocks by sixteen times. After step S502, the processing in the hierarchical processing circuit 207 proceeds to step S503, which is performed by the region extraction circuit 302.

In step S503, the region extraction circuit 302 extracts a partial region from the 1/16 gain image subjected to the enlargement processing by the first enlargement circuit 300, as the specific region. Specifically, the region extraction circuit 302 extracts an image region corresponding to the size and the position of the divided block in the 1/16 gain image 205 from the 1/16 gain image subjected to the enlargement processing by the first enlargement circuit 300, as the specific region. After step S504, the processing in the hierarchical processing circuit 207 proceeds to processing in step S504, which is performed by the first hierarchical addition circuit 303.

In step S504, the first hierarchical addition circuit 303 combines the divided block in the 1/16 gain image 205 and the image of the specific region extracted by the region extraction circuit 302 by the hierarchical addition processing. After step S504, the processing in the hierarchical processing circuit 207 proceeds to step S505, which is performed by the second enlargement circuit 304.

In step S505, the second enlargement circuit 304 enlarges the 1/16 gain image of the divided block combined by the hierarchical addition processing performed by the first hierarchical addition circuit 303, by sixteen times. After step S505, the processing in the hierarchical processing circuit 207 proceeds to step S506, which is performed by the second hierarchical addition circuit 306.

In step S506, the second hierarchical addition circuit 306 combines the divided block in the 1/1 gain image 203 and the 1/1 gain image of the divided block enlarged by sixteen times by the second enlargement circuit 304, by the hierarchical addition processing. After step S506, the processing in the hierarchical processing circuit 207 proceeds to step S507.

In step S507, the second hierarchical addition circuit 306 determines whether the processing has been completed on all of the divided blocks. If an unprocessed divided block is still left (NO in step S507), the processing returns to step S502. This return leads to execution of the processing from steps S502 to S507 on the unprocessed divided block in the hierarchical processing circuit 207. This means that, in the case of the flowchart illustrated in FIG. 4, the 1/16 gain image after the enlargement processing by the first enlargement circuit 300 is read out from the RAM 104 and input to the region extraction circuit 302 as many times as the number of divided blocks at the hierarchical layer on the upper side (i.e., the intermediate hierarchical layer). Then, the region extraction circuit 302 extracts the specific region corresponding to the size and the position of the divided block at the intermediate hierarchical layer from the 1/16 gain image read out from the RAM 104.

If the second hierarchical addition circuit 306 determines that the processing has been completed on all of the divided blocks in step S507 (YES in step S507), the hierarchical processing in the hierarchical processing circuit 207 is determined to be completed and the processing according to the flowchart illustrated in FIG. 4 is ended.

In the following description, the processing for dividing the image into the blocks at the upper hierarchical layer and the intermediate hierarchical layer and the processing for extracting the specific region on the image of the lower hierarchical layer according to the first exemplary embodiment configured in the above-described manner, will be described.

FIGS. 5A to 5C illustrate concepts of the processing for dividing the image into the blocks and the processing for extracting the specific region according to the first exemplary embodiment.

FIG. 5A illustrates an overview of the block division of the above-described 1/1 gain image 203, FIG. 5B illustrates an overview of the block division of the 1/16 gain image 205, and FIG. 5C illustrates overviews of the enlargement processing and the processing for extracting the specific region on the 1/256 gain image 206. The examples illustrated in FIGS. 5A to 5C are examples in which the number of divided blocks in the horizontal direction is "5", and the number of divided blocks is set to x=5. The image is not divided in the vertical direction in the present exemplary embodiment, but the present exemplary embodiment can also be applied to when the image is divided in the vertical direction, in a similar manner.

In the present exemplary embodiment, a constraint is imposed in such a manner that the number of pixels as a horizontal size (the number of pixels in the horizontal direction) should be a multiple of 16 in each of divided blocks B1 to B4 in the 1/1 gain image 203 illustrated in FIG. 5A. Therefore, the horizontal size of each of the divided blocks B1 to B4 in the 1/1 gain image 203 is expressed like 16n, 32n, 48n, or 64n assuming that "n" represents a natural number. The constraint on the number of pixels as the horizontal size of each of the divided blocks B1 to B4 is a numerical value determined according to various factors such as the number of hierarchical layers in the case where the hierarchical processing like the present exemplary embodiment is performed, and a codec format. Further, a horizontal size of the divided block B5 in the 1/1 gain image 203 does not have to be a multiple of 16 because this block is a block defined by a region left over when the 1/1 gain image 203 is divided into each of the divided blocks B1 to B4. A start coordinate of each of the divided blocks B1 to B5 in this 1/1 gain image 203 in the horizontal direction corresponds to the above-described position where the blocks are separated for every 16n.

Further, the 1/16 gain image 205 illustrated in FIG. 5B is the image generated by reducing the 1/1 gain image 203 to 1/16. Therefore, the horizontal sizes and the start coordinates of the individual divided blocks B1 to B4 in the 1/16 gain image 205 are 1/16 of the examples in the 1/1 gain image 203, i.e., 16n÷16=n, and are expressed like n, 2n, 3n, and 4n, respectively. In other words, the horizontal size of each of the divided blocks B1 to B4 in the 1/16 gain image 205 is set to an integer and therefore the start coordinate is also set to an integer while being arranged at an even interval, which prevents, for example, the control of the readout of the image data from the RAM 104 from being complicated. The divided block B5 in the 1/16 gain image 205 is a block defined by a region left over when the 1/16 gain image 205 is divided into each of the divided blocks B1 to B4.

On the other hand, regarding the 1/256 gain image 206 illustrated in FIG. 5C, the entire image is read out from the RAM 104 at once every time the divided block of the hierarchical layer on the upper side (the intermediate hierarchical layer) is processed after the entire image is enlarged by sixteen times as described above. In other words, the image is not divided into the blocks at the lower hierarchical layer, so that the 1/16 gain image subjected to the enlargement processing at the lower hierarchical layer is an image corresponding to a region in a wider angle of view than a region in an angle of view corresponding to the horizontal size of the divided block at the hierarchical layer on the upper side (the intermediate hierarchical layer). Then, the region extraction circuit 302 extracts only the specific region corresponding to the divided block in the 1/16 gain image 206 from the 1/16 gain image subjected to the enlargement processing by the first enlargement circuit 300 and read out from the RAM 104. For example, the region extraction circuit 302 extracts a specific region B1 corresponding to the divided block B1 in the 1/16 gain image 205 from the 1/16 gain image after the enlargement processing of the 1/256 gain image 206, when the divided block B1, which is the first block in the 1/16 gain image 205, is processed. The region extraction circuit 302 extracts a specific region B2 corresponding to the divided block B2 in the 1/16 gain image 205 from the 1/16 gain image after the enlargement processing of the 1/256 gain image 206, when the divided block B2, which is the second block in the 1/16 gain image 205, is processed. The same also applies to the remaining blocks. In other words, the start coordinate and the horizontal size of the specific region extracted by the region extraction circuit 302 are set to the same as the start coordinate and the horizontal size corresponding to each of the divided blocks in the 1/16 gain image 205. A remaining region after the specific region is extracted from the 1/16 gain image after the enlargement processing of the 1/256 gain image 206 is cut (removed without being used) because being unnecessary at the time of the hierarchical addition processing by the first hierarchical addition circuit 303 at the subsequent stage.

Figure 6A:
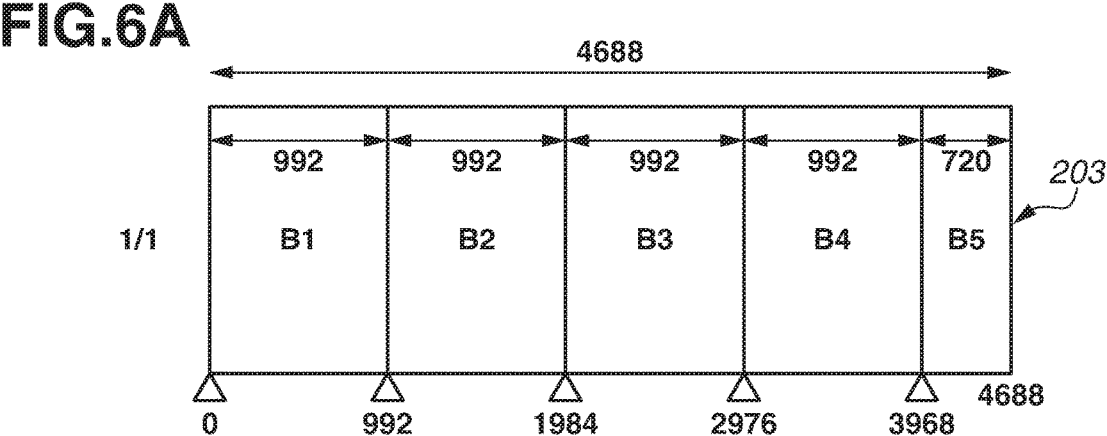
FIG. 6A illustrates examples of specific numerical values in the block division of the 1/1 gain image.
Figure 6B:
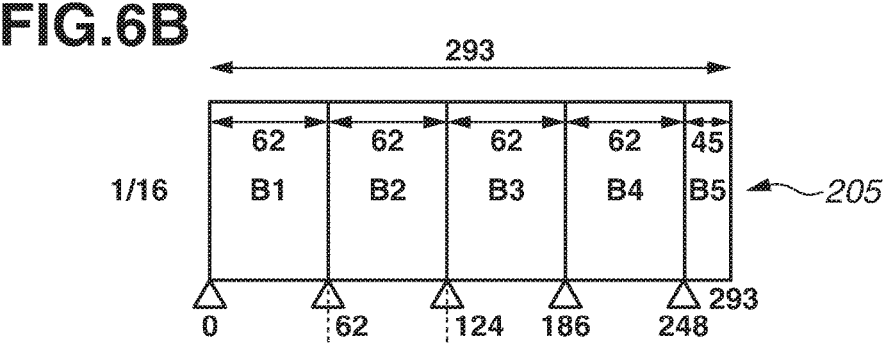
FIG. 6B illustrates examples of specific numerical values of the block division of the 1/16 gain image.
Figure 6C:
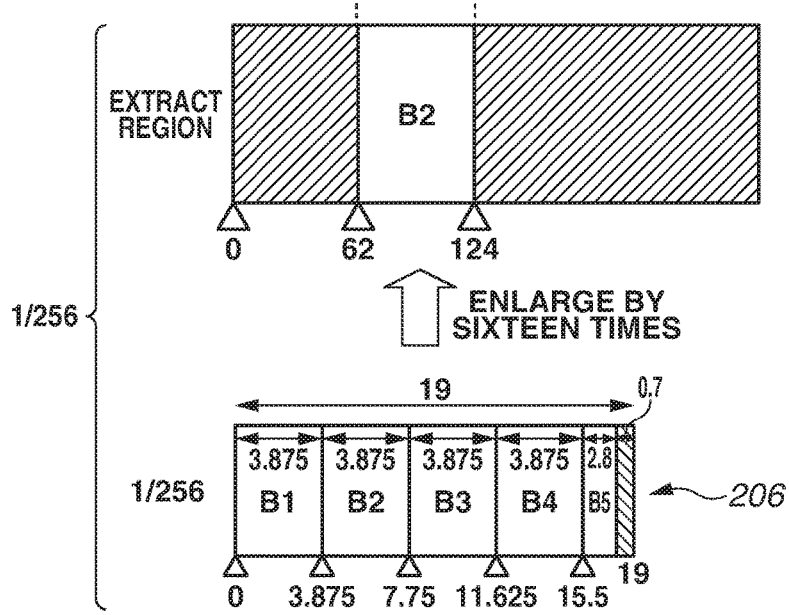
FIG. 6C illustrates examples of specific numerical values in the enlargement processing and the processing for extracting the specific region on the 1/256 gain image.

FIGS. 6A to 6C illustrate the concepts of the block division of the image and the extraction of the specific region, citing specific numerical values. Similar to the examples illustrated in FIGS. 5A to 5C, FIG. 6A illustrates the divided blocks in the 1/1 gain image 203, FIG. 6B illustrates the divided blocks in the 1/16 gain image 205, and FIG. 6C illustrates the enlargement processing and the specific region of the 1/256 gain image 206.

Suppose that the horizontal size (the number of pixels in the horizontal direction) of the entire image of the 1/1 gain image 203 illustrated in FIG. 6A is 4688 pixels. Further, suppose that the horizontal size of each of the divided blocks B1 to B4 in the 1/1 gain image 203 is 992 pixels, which is within 1000 that is the above-described maximum number of pixels in the horizontal direction and is also a multiple of 16. However, the horizontal size of the divided block B5 left over after the 1/1 gain image 203 is divided into each of the divided blocks B1 to B4 is 720 pixels. In the case of this example illustrated in FIG. 6A, the respective readout start positions of the individual divided blocks B1 to B5 are integers, like "0", "992", "1984", "2976", and "3968", respectively, when being converted into the number of pixels in the horizontal direction. These numbers of pixels as the readout start positions each correspond to the number of pixels counted by the above-described pixel counter.

Further, in the case of the 1/16 gain image 205 illustrated in FIG. 6B, the horizontal size of the entire image is 1/16 of the horizontal size of the entire image of the 1/1 gain image 203 (4688), and therefore is 4688÷16=293 pixels. Further, the horizontal size of each of the divided blocks B1 to B4 in the 1/16 gain image 205 is 1/16 of the horizontal size of the divided block in the 1/1 gain image 203 (992), and therefore is 992÷16=62 pixels. Then, 45 pixels remain as the horizontal size of the divided block B5 left over after the 1/16 gain image 205 is divided into each of the divided blocks B1 to B4. Therefore, the respective readout start positions of the individual divided blocks B1 to B5 in the 1/16 gain image 205 are integers, like "0", "62", "124", "186", and "248", respectively.

On the other hand, the horizontal size of the entire image of the 1/256 gain image 206 illustrated in FIG. 6C is 1/256 of the horizontal size of the entire image of the 1/1 gain image 203 (4688), and therefore is 4688÷256=18.3 pixels and is set to 19 pixels by rounding up the decimal fraction to the nearest whole number. A region indicated by a shaded pattern in the drawing in the 1/256 gain image 206 illustrated in FIG. 6C represents a region increased by the rounding-up. Then, for example, hypothetically supposing that the 1/256 gain image 206 is divided into the blocks as, for example, the division into five blocks similarly to the 1/1 gain image 203 and the 1/16 gain image 205, what happens in this case will be described now. In this case, the horizontal size of each of the divided blocks B1 to B4 generated by dividing the 1/256 gain image 206 into the five blocks is 3.875 pixels, which means that there is a decimal fraction. The horizontal size of the divided block B5 in the 1/256 gain image 206 is a size defined by adding a region left over after each of the divided blocks B1 to B4 is removed from 18.3 pixels and the region indicated by the shaped pattern in the drawing, and is a size containing a decimal fraction. The presence of the decimal fraction in the horizontal size of each of the divided blocks in this manner undesirably extremely complicates the processing that reads out the image from the RAM 104 divided-block by divided-block.

On the other hand, in the first exemplary embodiment, the hierarchical processing circuit 207 is configured to refrain from dividing the 1/256 gain image 206 into the blocks and read out the entire image from the RAM 104 at once as described above, and therefore does not have to handle the decimal fraction like the above-described example. In the first exemplary embodiment, the first enlargement circuit 300 enlarges the 1/256 gain image 206 by sixteen times, and, after that, the region extraction circuit 302 extracts the specific region based on the size and the position according to each of the divided blocks in the 1/16 gain image 205, as described above. In other words, the 1/16 gain image after the enlargement processing at the lower hierarchical layer is the image corresponding to the wider angle of view than the angle of view corresponding to the divided block of the intermediate hierarchical layer, and the specific region is extracted from the 1/16 gain image after the enlargement processing at this lower hierarchical layer, as the region corresponding to the angle of view of the divided block of the intermediate hierarchical layer. Specifically, the specific region is extracted at the position expressed by the number of pixels that is the integer matching the readout start position of each of the divided blocks in the 1/16 gain image 205. The example illustrated in FIG. 6C indicates an example in which the specific region corresponding to the divided block B2 (a divided block from a pixel 62 to a pixel 124) in the 1/16 gain image 205 is extracted. In the case of this example illustrated in FIG. 6C, the specific region is a region between the pixel 62 and the pixel 124 in the 1/16 gain image generated by enlarging the 1/256 gain image 206 by sixteen times. The region left after the specific region is extracted is cut because being unnecessary for the hierarchical addition processing at the subsequent stage.

In this manner, in the first exemplary embodiment, the image of the hierarchical layer on the lower side is subjected to the enlargement processing according to the hierarchical layer one layer higher than this hierarchical layer, and, after that, the specific region corresponding to the horizontal size and the start coordinate of the divided block of the hierarchical layer on the upper side is extracted from the image after this enlargement processing. Then, the image of the specific region subjected to the region extraction and the image of the divided block of the hierarchical layer on the upper side are combined by being hierarchically added to each other. Therefore, the first exemplary embodiment allows the pixel position to be calculated as an integer, thereby significantly facilitating the processing for reading out the image from the RAM 104. In other words, according to the first exemplary embodiment, it becomes possible to not only achieve the cost reduction by allowing a line memory having a small size to be used, but also realize image processing with a high processing performance by facilitating the processing for reading out the image from the RAM 104.

FIGS. 7A to 7C each illustrate an example of the number of divided blocks for each of the hierarchical layers in the case where the maximum size of the input image 200 in the horizontal direction is, for example, 8000 pixels. Further, FIGS. 8A to 8C illustrate respective examples of the numbers of divided blocks at the upper hierarchical layer and the intermediate hierarchical layer and the image of the lower hierarchical layer according to the first exemplary embodiment, in the case where the maximum size of the input image 200 in the horizontal direction is, for example, 8000 pixels. The examples illustrated in FIGS. 7A to 7C are used for a comparison with the examples illustrated in FIGS. 8A to 8B according to the first exemplary embodiment, and indicate the examples when the image is divided into the blocks according to the same number of divided blocks at all the hierarchical layers. FIGS. 7A and 8A illustrate the 1/1 gain image 203, FIGS. 7B and 8B illustrate the 1/16 gain image 205, and FIGS. 7C and 8C illustrate the 1/256 gain image 206.

In FIGS. 7A to 7C and 8A to 8C, the horizontal size of the 1/1 gain image 203 is 8000 pixels as described above. Therefore, the horizontal size of the 1/16 gain image 205 is 8000÷16=500 pixels, and the horizontal size of the 1/256 gain image 206 is 8000÷256=31.25 and is thus set to 32 pixels by rounding up the decimal fraction to the nearest whole number. Further, in FIGS. 7A to 7C and 8A to 8C, assume that the horizontal size by which the 1/1 gain image 203 can be processed at once is, for example, 1000 pixels at most.

In FIGS. 7A to 7C, the horizontal size by which the 1/1 gain image 203 can be processed at once is 1000 pixels at most, which raises such a constraint on the number of pixels that the number of pixels should be a value exactly divisible by 256 to acquire an integer as the horizontal size of the divided block in the 1/256 gain image 206. Under this constraint, a maximum value of the horizontal size when the 1/1 gain image 203 is divided into the blocks is determined to be 768 pixels as illustrated in FIG. 7A. Similarly, the horizontal size of the divided block in the 1/16 gain image 205 is 48 pixels from 768÷16=48 as illustrated in FIG. 7B, and the horizontal size of the divided block in the 1/256 gain image 206 is 3 pixels from 768÷256=3 as illustrated in FIG. 7C. Therefore, in the examples illustrated in FIGS. 7A to 7C, the numbers of divided blocks at the individual hierarchical layers are each 11 blocks.

On the other hand, in the first exemplary embodiment, the image is divided into the blocks at the upper hierarchical layer and the intermediate hierarchical layer but is not divided into the blocks at the lower hierarchical layer as described above. Further, the horizontal size by which the 1/1 gain image 203 can be processed at once is assumed to be 1000 pixels at most. In the case of the first exemplary embodiment, the 1/1 gain image 203 and the 1/16 gain image 205 are divided into the blocks but the 1/256 gain image 206 is not divided into the blocks. In the examples illustrated in FIGS. 8A to 8C, the horizontal size of the divided block in the 1/16 gain image 205 should be an integer, and therefore the maximum value of the horizontal size when the 1/1 gain image 203 is divided into the blocks is determined to be 992 pixels, which is a maximum value exactly divisible by 16. Further, the horizontal size of each of the divided blocks in the 1/16 gain image 205 is 62 pixels from 992÷16=62. From these conditions, in the case of the first exemplary embodiment, the number of divided blocks in each of the 1/1 gain image 203 and the 1/16 gain image 205 is 9 blocks as illustrated in FIGS. 8A and 8B. On the other hand, as illustrated in FIG. 8C, the 1/256 gain image 206 is not divided into the blocks since the entire image is read out at once, and is read out from the RAM 104 as many times as the number of divided blocks in the 1/16 gain image 205 of the intermediate hierarchical layer as described above. In other words, the examples illustrated in FIGS. 8A to 8C can reduce the number of divided blocks compared to dividing the image into the blocks according to the same number of divided blocks at all the hierarchical layers like the examples illustrated in FIGS. 7A to 7C.

The above-described exemplary embodiment has been described referring to the example of hierarchical processing using the three hierarchical layers for 1/1, 1/16, and 1/256, but can also be easily applied to when the image is processed at further more hierarchical layers. In this case, these many hierarchical layers are divided in the middle into two hierarchical layer groups, and individual hierarchical layers on an upper side are set as an upper hierarchical layer group and individual hierarchical layers on a lower side are set as a lower hierarchical layer group. The image is processed divide-block by divided-block at the upper hierarchical layer group, but is not divided into the blocks at the lower hierarchical layer group. Further, regarding the lower hierarchical layer group, the image thereof is enlarged and the specific region is extracted according to the divided block of the upper hierarchical layer group above it just before being hierarchically added to the image of the upper hierarchical layer group. Then, the divided block of the upper hierarchical layer group and specific region extracted from the lower hierarchical layer group subjected to the enlargement processing are hierarchically added to each other. In the case where the image is processed at a large number of hierarchical layers as many as three or more, like this example, the present exemplary embodiment can also be applied and expected to bring about similar effects to the above-described effects.

As described above, the hierarchical processing circuit 207 according to the present exemplary embodiment controls whether to divide the image into the blocks for each of the hierarchical layers, and operates so as to refrain from dividing the image into the blocks at the hierarchical layer on the lower side but divide the image into the blocks at the hierarchical layer on the upper side, when performing the enlargement processing and the hierarchical addition on the image distributed for each of the hierarchical layers. Then, the hierarchical processing circuit 207 extracts the specific region corresponding to the divided block of the hierarchical layer on the upper side from the image subjected to the enlargement processing at the hierarchical layer on the lower side where the image is not divided into the blocks, and hierarchically adds the image of this specific region and the divided block of the hierarchical layer on the upper side. By this configuration, according to the present exemplary embodiment, it is possible to ease the constraint on the number of pixels as the horizontal size of the divided block to further reduce the number of divided blocks, and improve the processing performance, when processing the image of each of the hierarchical layers after dividing it into the blocks.

Further, the above-described exemplary embodiment has been described referring to the example that performs the hierarchical processing, but can also be applied to various functions including, for example, enlargement processing, besides the hierarchical processing when the image is processed divided-block by divided-block. For example, the above-described exemplary embodiment can also ease the constraint on the number of divided blocks in a case where two images are subjected to waiting processing and then subjected to addition or subtraction processing, template matching processing, or the like.

In this case, the above-described exemplary embodiment can also be applied by performing similar control to the above-described control with respect to processing other than the hierarchical addition, and employs processing that reads out the image at once and extracts the specific region according to the divided block after the enlargement processing similarly to the above-described application. At this time, if a pixel position corresponding to the specific region to be extracted by the region extraction circuit and located at an edge of the image before the enlargement processing is placed at a position expressed by a decimal fraction, the image is read out in such a manner that the readout starts from a pixel position expressed by an integer containing at least this position. Further, an enlargement ratio in the enlargement processing in this case may be any ratio as long as this ratio allows the pixel position at the edge after the enlargement to be placed at an integer position.

The above-described first exemplary embodiment has been described as the example in which the 1/256 gain image 206 of the lower hierarchical layer is processed after the entire image is read out from the RAM 104 at once without being divided into the blocks. A second exemplary embodiment will be described as an example that divides even the 1/256 gain image 206 into the blocks and reads out only a required region divided-block by divided-block. The imaging apparatus according to the second exemplary embodiment is configured similarly to the imaging apparatus 100 illustrated in the above-described drawing, FIG. 1, and the hierarchical processing circuit 207 of the image processing circuit 110 is also configured similarly to the above-described drawing, FIG. 2. Therefore, illustration and descriptions thereof will be omitted here. In the case of the second exemplary embodiment, the first enlargement circuit 300 divides the 1/256 gain image 206 into the blocks and enlarges the image by sixteen times divided-block by divided-block.

Figure 9:
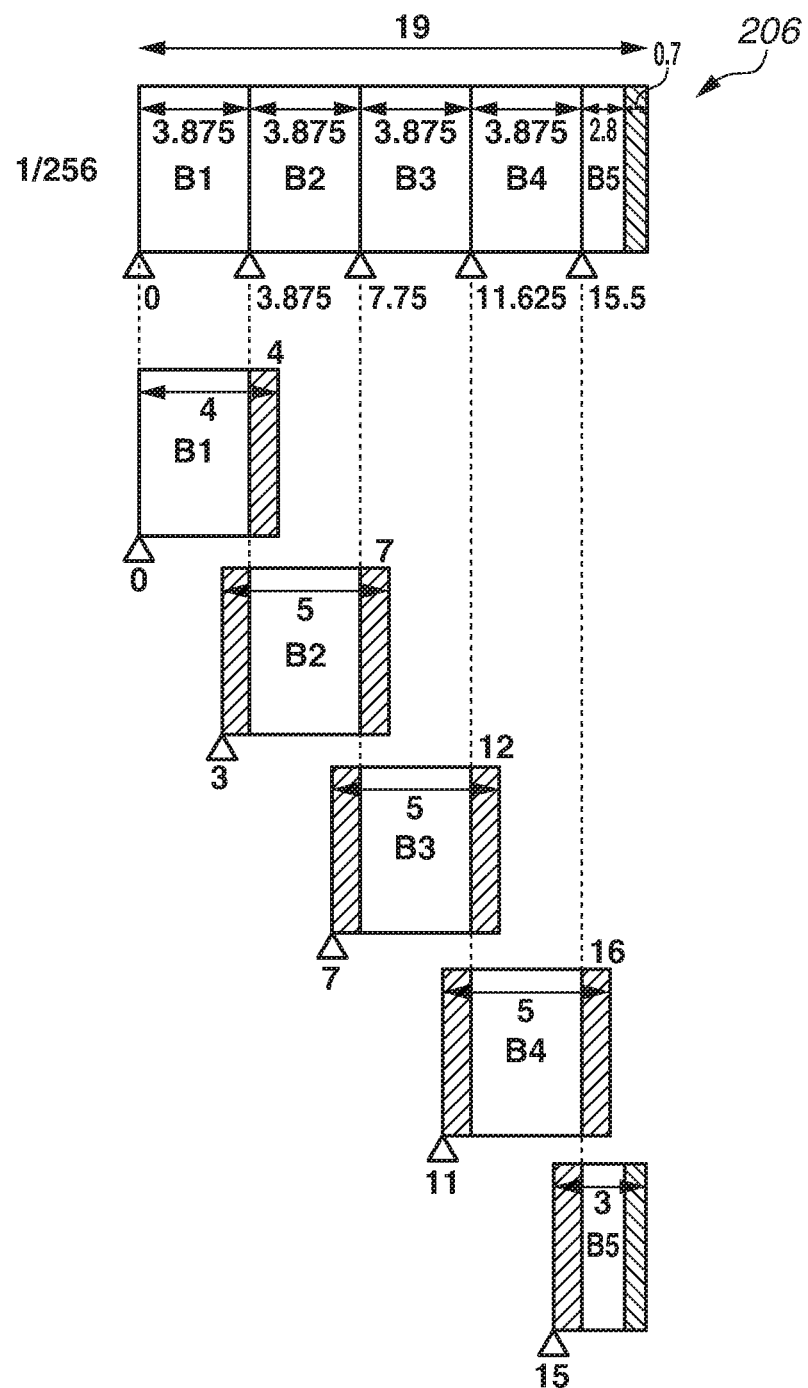
FIG. 9 illustrates an example of readout of the divided block of the lower hierarchical layer according to a second exemplary embodiment.

FIG. 9 illustrates readout from the RAM 104 divided-block by divided-block in the case where the 1/256 gain image 206 is divided into the blocks according to the second exemplary embodiment. In the example illustrated in FIG. 9, assume that the 1/1 gain image 203 and the 1/16 gain image 205 are each divided into five blocks as illustrated in, for example, the above-described drawings, FIGS. 5A and 5B or FIGS. 6A and 6B although this is omitted from the illustration. Further, assume that the 1/256 gain image 206 is divided into five blocks similarly to each of the divided blocks B1 to B4 and the divided block B5 as described in the description of FIG. 6C.

In the case where the 1/256 gain image 206 is divided into the divided blocks B1 to B5 like the second exemplary embodiment, a first or last position among pixels in each of the divided blocks that are required in the processing at the subsequent stage is placed at a position expressed by a decimal fraction when being converted into the number of pixels as described with reference to FIG. 6C. Therefore, in the case of the second exemplary embodiment, the image is read out from an integer position containing at least the position expressed by the decimal fraction when the data of each of the divided blocks B1 to B5 in the 1/256 gain image 206 is read out from the RAM 104.

This readout will be specifically described. In the 1/256 gain image 206, the first position of the divided block B1 in the horizontal direction is an integer position (0), so that the image is read out just from the first position of the divided block B1 in the horizontal direction. On the other hand, the last position of the divided block B1 in the horizontal direction is 3.875 when being converted into the number of pixels, so that the image is read out as far as the fourth pixel, which is an integer position containing 3.875 and located in a direction where the number of pixels is larger. Next, the first position of the divided block B2 is 3.875 when being converted into the number of pixels, so that the image is read out from the third pixel, which is an integer position containing 3.875 and located in a direction where the number of pixels is smaller. On the other hand, the last position of the divided block B2 is 7.75 when being converted into the number of pixels, so that the image is read out as far as the eighth pixel, which is an integer position containing 7.75 and located in the direction in which the number of pixels is larger. The same applies to the remaining blocks, and, for each of the divided blocks B3 to B5, the image is read out so as to contain a decimal fraction at the first or last position for each of them. Then, the first enlargement circuit 300 enlarges a region having an extra portion as far as the integer position containing the decimal fraction for each of the divided blocks B1 to B5 as described above, by sixteen times, and, after that, outputs this region to the region extraction circuit 302. In other words, in the second exemplary embodiment, the region including the extra portion in addition to the divided block at the lower hierarchical layer serves as the region corresponding to the wider angle of view than the angle of view corresponding to the horizontal size of the divided block at the hierarchical layer on the upper side (the intermediate hierarchical layer).

The region extraction circuit 302 according to the second exemplary embodiment cuts a region corresponding to the extra portion from a 1/16 gain image generated by enlarging the region including the extra portion in addition to the divided block as described above by sixteen times. Then, the region extraction circuit 302 outputs data of the 1/16 gain image of the divided block after this cutting to the first hierarchical addition circuit 303. Processing in each of the units at and after the first hierarchical addition circuit 303 is similar to the processing in the case of the first exemplary embodiment, and therefore a description thereof will be omitted here.

In this manner, in the case of the second exemplary embodiment, the region including the extra portion as far as the integer position containing the decimal fraction is read out for each of the divided blocks B1 to B5 as described above. In other words, in the second exemplary embodiment, the image generated by enlarging the region corresponding to the wider angle of view than the angle of view corresponding to the horizontal size of the divided block at the hierarchical layer on the upper side (the intermediate hierarchical layer) is output from the first enlargement circuit 300. Further, the region extraction circuit 302 cuts the region corresponding to the extra portion from the 1/16 gain image generated by enlarging the region including the extra portion in addition to the divided block by sixteen times. Therefore, in the case of the second exemplary embodiment, the readout position and the readout size of the 1/256 gain image 206, and the region cut by the region extraction circuit 302 are different for each of the divided blocks. For example, in the case of the example illustrated in FIG. 9, the horizontal size at the time of the readout that includes the extra portion is four pixels for the divided block B1, but is five pixels for the divided blocks B2 to B4 and three pixels for the divided block B5. Therefore, in the case of the second exemplary embodiment, the imaging apparatus allows the readout position and the readout size of the 1/256 gain image 206 and the region cut by the region extraction circuit 302 to be changed by controlling the settings of the above-described parameters at the time of the block division. Specifically, in the case of the example illustrated in FIG. 9, the parameters are set in such a manner that the region corresponding to the four pixels including the extra portion is used as the size and the position of the divided block for the divided block B1. Similarly, the parameters are set in such a manner that the region corresponding to the five pixels including the extra portion is used as the size and the position of the divided block for the divided blocks B2 to B4 and the region corresponding to the three pixels including the extra portion is used as the size and the position of the divided block for the divided block B5, respectively. These settings allow the image to be read out like the example illustrated in FIG. 9.

In the above-described manner, according to the second exemplary embodiment, it is expected that the imaging apparatus does not have to handle the pixel position expressed by the decimal fraction for each of the divided blocks B1 to B5 in the 1/256 gain image 206, and can read out each of the divided blocks B1 to B5 in the 1/256 gain image 206 by reading out only a minimum required amount. Therefore, in the case of the second exemplary embodiment, the amount of reading out the image can be reduced compared to when the entire image of the 1/256 gain image 206 is read out at once like the above-described first exemplary embodiment. In the second exemplary embodiment, it also becomes possible to realize the image processing with the high processing performance while achieving the cost reduction.

In the above-described manner, according to the first and second exemplary embodiments, the constraint on the number of pixels can be eased when the image is processed after being divided into the blocks for each of the hierarchical layers. Further, the employment of the processing described in the first exemplary embodiment allows the processing to be performed with further simplified control of, for example, a change in the parameters. On the other hand, the employment of the processing described in the second exemplary embodiment can further reduce the amount of reading out the image. In any of the first and second exemplary embodiments, the number of divided blocks can be reduced compared to the conventional processing, and the processing performance can be improved.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-206333, filed Oct. 20, 2016, which is hereby incorporated by reference herein in its entirety.

What is claimed is:

1. An image processing apparatus comprising:
a processor; and
a memory containing instructions that, when executed by the processor, cause the processor to perform operations comprising:
generating an image of a second hierarchical layer and an image of a third hierarchical layer from an image of a first hierarchical layer, the image of the second hierarchical layer being a reduced image generated by reducing the image of the first hierarchical layer, and the image of the third hierarchical layer being a reduced image generated by reducing the image of the second hierarchical layer;
enlarging an image of a first region of the image of the third hierarchical layer and extracting an image of a second region from the enlarged image of the first region;
combining the extracted image of the second region and an image of a region corresponding to the second region included in the image of the second hierarchical layer to generate a first composite image;
enlarging the first composite image; and
combining the enlarged first composite image and an image of a region corresponding to the second region included in the image of the first hierarchical layer to generate a second composite image,
wherein the image of the first hierarchical layer and the image of the second hierarchical layer are divided into a same number of blocks,
wherein the second region corresponds to one of the blocks, and
wherein the first region is larger than the region corresponding to the second region.

2. The image processing apparatus according to claim 1, wherein the first region is an entire region of the image of the third hierarchical layer.

3. The image processing apparatus according to claim 1, wherein a size of an image of a region corresponding to the second region included in the image of the third hierarchical layer is expressed by a number of pixels including a decimal point, and
wherein a size of an image of a region corresponding to the first region is expressed by an integer number of pixels.

4. An image processing method comprising:
generating an image of a second hierarchical layer and an image of a third hierarchical layer from an image of a first hierarchical layer, the image of the second hierarchical layer being a reduced image generated by reducing the image of the first hierarchical layer, and the image of the third hierarchical layer being a reduced image generated by reducing the image of the second hierarchical layer;
enlarging an image of a first region of the image of the third hierarchical layer and extracting an image of a second region from the enlarged image of the first region;
combining the extracted image of the second region and an image of a region corresponding to the second region included in the image of the second hierarchical layer to generate a first composite image;
enlarging the first composite image; and
combining the enlarged first composite image and an image of a region corresponding to the second region included in the image of the first hierarchical layer to generate a second composite image,
wherein the image of the first hierarchical layer and the image of the second hierarchical layer are divided into a same number of blocks,
wherein the second region corresponds to one of the blocks, and
wherein the first region is larger than the region corresponding to the second region.

5. A non-transitory computer-readable storage medium containing instructions that, when executed by a processor, cause the processor to perform operations comprising:
generating an image of a second hierarchical layer and an image of a third hierarchical layer from an image of a first hierarchical layer, the image of the second hierarchical layer being a reduced image generated by reducing the image of the first hierarchical layer, and the image of the third hierarchical layer being a reduced image generated by reducing the image of the second hierarchical layer;
enlarging an image of a first region of the image of the third hierarchical layer and extracting an image of a second region from the enlarged image of the first region;
combining the extracted image of the second region and an image of a region corresponding to the second region included in the image of the second hierarchical layer to generate a first composite image;
enlarging the first composite image; and
combining the enlarged first composite image and an image of a region corresponding to the second region included in the image of the first hierarchical layer to generate a second composite image, wherein the image of the first hierarchical layer and the image of the second hierarchical layer are divided into a same number of blocks, wherein the second region corresponds to one of the blocks, and wherein the first region is larger than the region corresponding to the second region.

* * * * *